United States Patent [19]

MacGregor et al.

[11] Patent Number: 4,584,640
[45] Date of Patent: Apr. 22, 1986

[54] METHOD AND APPARATUS FOR A COMPARE AND SWAP INSTRUCTION

[75] Inventors: Douglas MacGregor; David S. Mothersole, both of Austin, Tex.; John Zolnowsky, Menlo Park, Calif.

[73] Assignee: Motorola, Inc., Schaumburg, Ill.

[21] Appl. No.: 624,864

[22] Filed: Jun. 27, 1984

[51] Int. Cl.⁴ .............................................. G06F 1/00
[52] U.S. Cl. .................................................. 364/200
[58] Field of Search ... 364/200 MS File, 300 MS File, 364/900 MS File

[56] References Cited

U.S. PATENT DOCUMENTS

| | | | |
|---|---|---|---|
| 3,972,026 | 7/1976 | Waitman et al. | 364/900 |
| 4,041,462 | 8/1977 | Davis et al. | 364/200 |
| 4,054,945 | 10/1977 | Ichiko et al. | 364/200 |
| 4,281,393 | 7/1981 | Gitelman et al. | 364/900 |
| 4,322,812 | 3/1982 | Davis et al. | 364/900 |
| 4,403,285 | 9/1983 | Kikuchi | 364/200 |
| 4,429,360 | 1/1984 | Hoffman et al. | 364/200 |
| 4,497,023 | 1/1985 | Moorer | 364/200 |

Primary Examiner—James D. Thomas
Assistant Examiner—William G. Niessen
Attorney, Agent, or Firm—Anthony J. Sarli, Jr.; Jeffrey Van Myers; James L. Clingan, Jr.

[57] ABSTRACT

In a data processing system having linked lists it is useful to be able to add and delete items from such lists while maintaining the integrity of the linked nature of such lists. A new compare and swap instruction provides for effectively simultaneously swapping 2 values which is useful for safely adding and deleting items from linked lists. Prior to the instruction the status of the two value are read at the locations to be swapped. During the instruction these locations are checked again to ensure that no change has occurred at these locations before the instruction performs the swap of the two new values. The instruction then performs the proposed 2 value swap but only if no change has occurred at these two locations where the swap is to be performed.

6 Claims, 8 Drawing Figures

METHOD AND APPARATUS FOR A COMPARE AND SWAP INSTRUCTION

FIELD OF THE INVENTION

The subject application relates to instructions for data processors, and more particularly, to instructions for manipulating items in a list in a data processor.

BACKGROUND OF THE INVENTION

One aspect typical of a data processing system is operating with lists. Each list is comprised of a number of items. Each item is something to be performed or used by the data processing system. Items are typically processes, data, programs, or subroutines. One way of keeping track of a list is to have a head pointer and a tail pointer for each list. The head pointer points to the first item in the list. The tail pointer points to the last item in the list. In a singly-linked list the first item has a next pointer which points to the next item in the list which is then the second item in the list. The second item has also a next pointer which points at the item which follows next after the second item which is then the third item. The third item similarly has a next pointer which points at the fourth item, and so forth to the last item in the list. The last item also has a next pointer, but since it is the last item, its next pointer is typically null (all zeros).

Another type of list which offers advantages relative to speed of traversing the list is the doubly-linked list. In such a list each item has not only a next pointer but also a back pointer. The back pointer is used to point just ahead in the list. For example, the back pointer of the third item in the list points to the second item while the next pointer of the third item points to the fourth item. The last item's next pointer is still null while its back pointer points to the next-to-last item, assuming of course that the list has more than one item. For the first item in the list the back pointer is null in view of there being no item ahead of it, and the next pointer points to the second item.

During the operation of the data processing system it is desirable to add and delete items from lists. One technique that has been developed in a mainframe data processing system for such an operation for singly-linked lists in an instruction called "compare and swap". The instruction can be used to cause the proper adjustment to the head pointer of the list so that an item can be added or deleted at the head of the list. Before the compare and swap instruction is excuted, however, the address in the head pointer is read and stored. Then if, for example, a new item is to be added, a swap value which can be substituted into the head pointer is prepared. This swap value when so substituted will cause the header pointer to point at the new item. The preparation of the new item includes causing its next pointer to point at the next following item which is the item which is at the head of the list prior to the addition of the new item. After the new item is ready, the stored address is compared to the address in the head pointer to make sure they are still the same. During the preparation of the new item, the list may have been altered causing the next pointer of the preceding item to also have been altered. If the compared addresses are different, the process must start over. If the compared addresses are the same, an address pointing to the new item (the swap value) is inserted into the next pointer of the preceding item, thus effecting the addition of the new item. As previously stated, lists often have tail and head pointers for assisting in keeping track of the lists. Such a compare and swap operation is not effective for adding or deleting at the end of the list even when the list has head and tail pointers. This is because not only the tail pointer must be changed but also the former last item must be changed to point at the new last item. This has not been available. Similarly, insertion and deletion was not available in the middle of a list because the item that is to point at the new item (in the case of a new item being added) may have been moved to a different list. Consequently, the compare test may be passed but the new item would be inserted into the wrong list.

SUMMARY OF THE INVENTION

An object of the subject invention is to provide an improved compare and swap instruction.

Another object of the invention is to provide an improved technique for changing two values in a data processing system.

Yet another object of the invention is to provide an improved technique for manipulating linked lists in a data processing system.

These and other objects of the invention are achieved in a data processor in which two values are to be changed effectively simultaneously. A first compare value is read at a first location where a value is to be changed. A second compare value is read at a second location where a value is to be changed. A first swap value is stored which is the value to be substituted for the value at the first location. A second swap value is stored which is the value to be substituted for the value at the second location. An instruction which is uninterruptable can then commence. The instruction compares the first compare value to the value present at the first location, and the second compare value to the value present at the second location. If the first and second compare values are the same as the respective values at the first and second location, the first swap value is input to the first location, and the second swap value is input to the second location.

DESCRIPTION OF THE INVENTION

Figure 1:
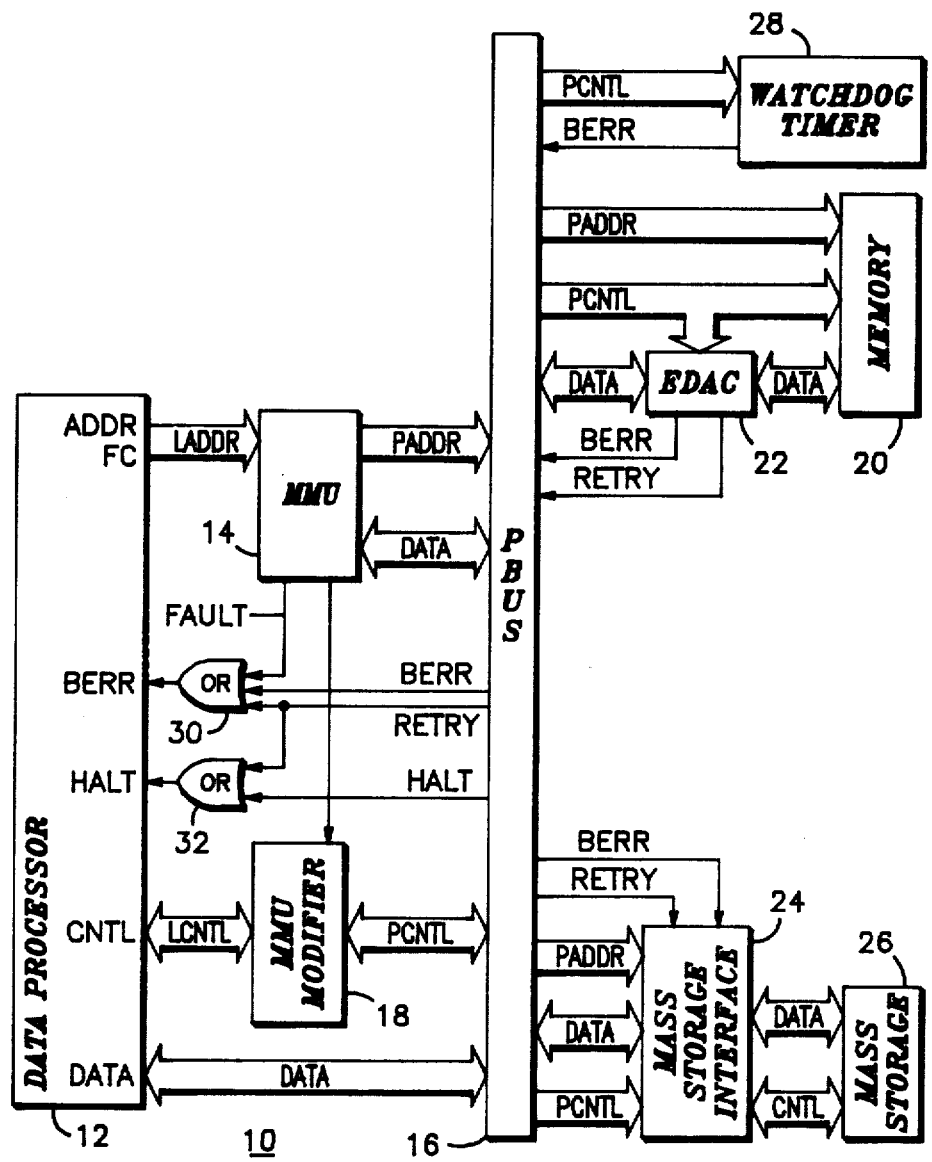
FIG. 1 is a block diagram of a data processing system useful for implementing the invention.

Shown in FIG. 1 is a data processing system 10 wherein logical addresses (LADDR) issued by a data processor (DP) 12 are mapped by a memory management unit (MMU) 14 to a corresponding physical address (PADDR) for output on a physical bus (PBUS) 16. Simultaneously, the various logical access control signals (LCNTL) provided by DP 12 to control the access are converted to appropriately timed physical access control signals (PCNTL) by a modifier unit 18 under the control of MMU 14. DP 12 is an example of a data processor which is capable of implementing the present invention relating to compare and swap instructions.

In response to a particular range of physical addresses (PADDR), memory 20 will cooperate with an error detection and correction circuit (EDAC) 22 to exchange data (DATA) with DP 12 in synchronization with the physical access control signals (PCNTL) on PBUS 16. Upon detecting an error in the data, EDAC 22 will either signal a bus error (BERR) or request DP 12 to retry (RETRY) the exchange, depending upon the type of error.

In response to a different physical address, mass storage interface 24 will cooperate with MP 12 to transfer data to or from mass storage 26. If an error occurs during the transfer, interface 24 may signal a bus error (BERR) or, if appropriate, request a retry (RETRY).

In the event that the MMU 14 is unable to map a particular logic address (LADDR) into a corresponding physical address (PADDR), the MMU 14 will signal an access fault (FAULT). As a check for MMU 14, a watchdog timer 28 may be provided to signal a bus error (BERR) if no physical device has responded to a physical address (PADDR) within a suitable time period relative to the physical access control signals (PCNTL).

If, during a data access bus cycle, a RETRY is requested, OR gates 30 and 32 will respectively activate the BERR and HALT inputs of DP 12. In response to the simultaneous activation of both the BERR and HALT inputs thereof during a DP-controlled bus cycle, DP 12 will abort the current bus cycle and, upon the termination of the RETRY signal, retry the cycle.

If desired, operation of DP 12 may be externally controlled by judicious use of a HALT signal. In response to the activation of only the HALT input thereof via OR gate 32, DP 12 will halt at the end of the current bus cycle, and will resume operation only upon the termination of the HALT signal.

In response to the activation of only the BERR input thereof during a processor-controlled bus cycle, DP 12 will abort the current bus cycle, internally save the contents of the status register, enter the supervisor state, turn off the trace state if on, and generate a bus error vector number. DP 12 will then stack into a supervisor stack area in memory 20 a block of information which reflects the current internal context of the processor, and then use the vector number to branch to an error handling portion of the supervisor program.

Up to this point, the operation of DP 12 is identical to the operation of Motorola's MC68000 microprocessor. However, DP 12 differs from the MC68000 in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/write, instruction/data and function code. In addition to the above information, DP 12 is constructed to stack much more information about the internal machine state. If the exception handler is successful in resolving the error, the last instruction thereof will return control of DP 12 to the aborted program. During the execution of this instruction, the additional stacked information is retrieved and loaded into the appropriate portions of DP 12 to restore the state which existed at the time the bus error occurred.

Figure 2:
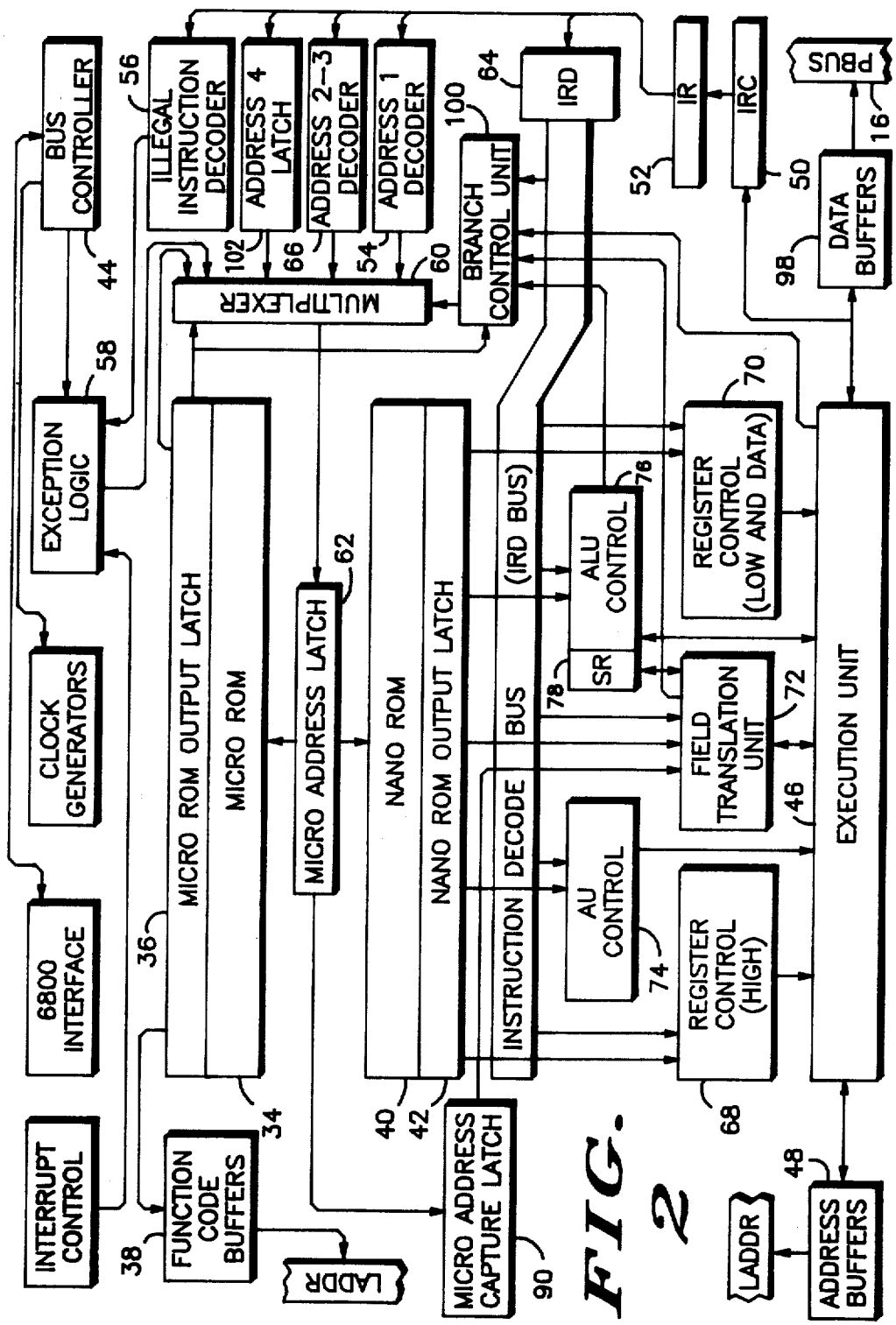
FIG. 2 is a block diagram of the data processor of FIG. 1.

The preferred operation of DP 12 will be described with reference to FIG. 2 which illustrates the internal organization of a microprogrammable embodiment of DP 12. Since the illustrated form of DP 12 is very similar to the Motorola MC68000 microprocessor described in detail in the several U.S. Patents cited hereafter, the common operation aspects will be described rather broadly. Once a general understanding of the internal architecture of DP 12 is established, the discussion will focus on the unique compare and swap feature of the present invention.

The DP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as macroinstructions to avoid confusion with the microinstructions. In the MC68000 and DP 12, each microinstruction comprises a microword which controls microinstruction sequencing and function code generation, and a corresponding nanoword which controls the actual routing of information between functional units and the actuation of special function units within DP 12. With this in mind, a typical instruction execution cycle will be described.

At an appropriate time during the execution of each instruction, a prefetch microinstruction will be executed. The microword portion thereof will, upon being loaded from micro ROM 34 into micro ROM output latch 36, enable function code buffers 38 to output a function code (FC) portion of the logical address (LADDR) indicating an instruction cycle. Upon being simultaneously loaded from nano ROM 40 into nano ROM output latch 42, the corresponding nanoword requests bus controller 44 to perform an instruction fetch bus cycle, and instructs execution unit 46 to provide the logical address of the first word of the next instruction to address buffers 48. Upon obtaining control of the PBUS 16, bus controller 44 will enable address buffers 48 to output the address portion of the logical address (LADDR). Shortly thereafter, bus controller 44 will provide appropriate data strobes (some of the LCNTL signals) to activate memory 20. When the memory 20 has provided the requested information, bus controller 44 enables instruction register capture (IRC) 50 to input the first word of the next instruction from PBUS 16. At a later point in the execution of the current instruction, another microinstruction will be executed to transfer the first word of the next instruction from IRC 50 into instruction register (IR) 52, and to load the next word from memory 20 into IRC 50. Depending upon the type of instruction in IR 52, the word in IRC 50 may be immediate data, the address of an operand, or the first word of a subsequent instruction. Details of the instruction set and the microinstruction sequences thereof are setforth fully in U.S. Pat. No. 4,325,121 entitled "Two Level Control Store for Microprogrammed Data Processor" issued Apr. 13, 1982 to Gunter et al., and which is hereby incorporated by reference.

As soon as the first word of the next instruction has been loaded into IR 52, address 1 decoder 54 begins decoding certain control fields in the instruction to determine the micro address of the first microinstruction in the initial microsequence of the particular instruction in IR 52. Simultaneously, illegal instruction decoder 56 will begin examining the format of the instruction in IR 52. If the format is determined to be incorrect, illegal instruction decoder 56 will provide the micro address of the first microinstruction of an illegal instruction microsequence. In response to the format error, exception logic 58 will force multiplexor 60 to substitute the micro address provided by illegal instruction decoder 56 for the micro address provide by address 1 decoder 54. Thus, upon execution of the last microinstruction of the currently executing instruction, the microword portion thereof may enable multiplexor 60 to provide to an appropriate micro address to micro address latch 62, while the nanoword portion thereof enables instruction register decoder (IRD) 64 to load the first word of the next instruction from IR 52. Upon the selected micro address being loaded into micro address latch 62, micro ROM 34 will output a respective microword to micro ROM output latch 36 and nano ROM 40 will output a corresponding nanoword to nano ROM output latch 42.

Generally, a portion of each microword which is loaded into micro ROM output latch 36 specifies the micro address of the next microinstruction to be executed, while another portion determines which of the alternative micro addresses will be selected by multiplexor 60 for input to micro address latch 62. In certain instructions, more than one microsequence must be executed to accomplish the specified operation. These tasks, such as indirect address resolution, are generally specified using additional control fields within the instruction. The micro addresses of the first microinstructions for these additional microsequences are developed by address 2-3 decoder 66 using control information in IR 52. In the simpler form of such instructions, the first microsequence will typically perform some preparatory task and then enable multiplexor 60 to select the micro address of the microsequence which will perform the actual operation as developed by the address 3 portion of address 2-3 decoder 66. In more complex forms of such instructions, the first microsequence will perform the first preparatory task and then will enable multiplexor 60 to select the micro address of the next preparatory microsequence as developed by the address 2 portion of address 2-3 decoder 66. Upon performing this additional preparatory task, the second microsequence then enables multiplexor 60 to select the micro address of the microsequence which will perform the actual operation as developed by the address 3 portion of address 2-3 decoder 66. In any event, the last microinstruction in the last microsequence of each instruction will enable multiplexor 60 to select the micro address of the first microinstruction of the next instruction as developed by address 1 decoder 54. In this manner, execution of each instruction will process through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al, and which is hereby incorporated by reference.

In contrast to the microwords, the nanowords which are loaded into nano ROM output latch 42 indirectly control the routing of operands into and, if necessary, between the several registers in the execution unit 46 by exercising control over register control (high) 68 and register control (low and data) 70. In certain circumstances, the nanoword enables field translation unit 72 to extract particular bit fields from the instruction in IRD 64 for input to the execution unit 46. The nanowords also indirectly control effective address calculations and actual operand calculations within the execution unit 46 by exercising control over AU control 74 and ALU control 76. In appropriate circumstances, the nanowords enable ALU control 76 to store into status register (SR) 78 the condition codes which result from each operand calculation by execution unit 46. A more detailed explanation of ALU control 76 is given in U.S. Pat. No. 4,312,034 entitled "ALU and Condition Code Control Unit for Data Processor" issued Jan. 19, 1982 to Gunter, et al, and which is hereby incorporated by reference.

A read-modify-write cycle (RMC) is available which ensures in advance that a write can follow a read without relinguishing the bus. This RMC mode is indicated by an RMC signal. During the RMC mode no other system resource can have access to the bus. The RMC mode and functions involved therewith are described in U.S. Pat. No. 4,348,722, entitled "Bus Processor", issued Sept. 7, 1982 to Gunter et al., and which is hereby incorporated by reference. The RMC signal can be brought out to an external pin to prevent system resources from attempting to gain access to the bus when the RMC signal is present. Additionally, in the preferred embodiment the RMC signal is controlled by microcode. Consequently, instructions can be made available which monopolize the bus for even longer than the two bus cycles required for a read followed by a write.

Such an instruction which can thus be made available is the compare and swap instruction for singly-linked lists (CAS1) as previously described. The CAS1 instruction, however, it is not helpful for doubly-linked lists. A compare and swap instruction for doubly-linked lists (CAS2) is the subject of the present invention. Shown in FIGS. 3A and 3B, placed top to bottom, is a micro-control flow diagram for performing the CAS2 instruction according to a preferred embodiment of the invention.

Figure 4A:
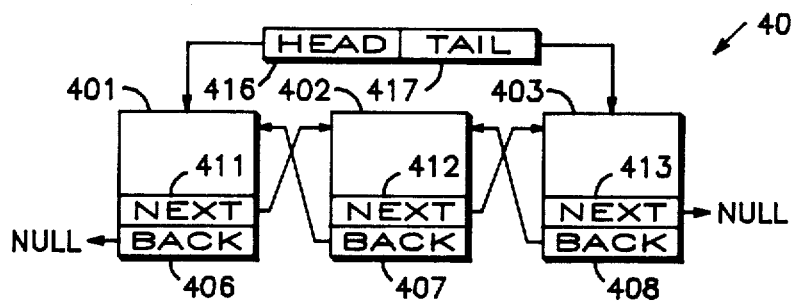
FIGS. 4A and 4B are diagrams of doubly-linked lists useful for understanding how to use the present invention to add or delete an item at an end of a doubly-linked list.
Figure 4B:
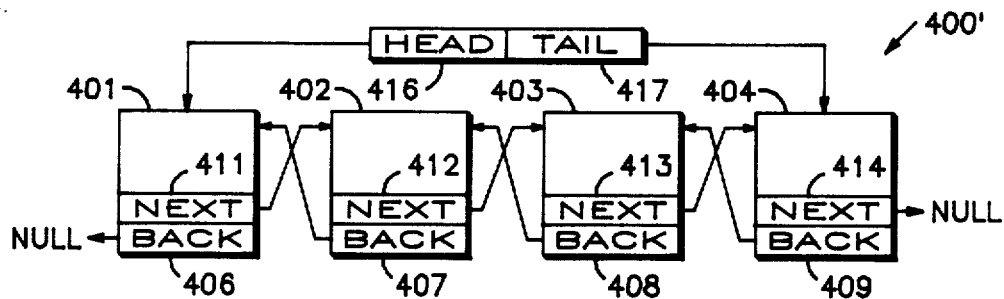

Shown in FIG. 4A is a list 400 comprised of an item 401, an item 402, and an item 403. Shown in FIG. 4B is a list 400' which further includes an item 404 as well as items 401–403. Each item 401–404 has a back pointer and a next pointer. The back pointers of items 401–404 are 406, 407, 408, and 409, respectively. The next pointers of items 401–404 are 411, 412, 413, and 414, respectively. List 400 also includes a head pointer 416 and a tail pointer 417. In list 400 item 401 is the head. Accordingly, head pointer 416 points to item 401. As the head of the list 400, back pointer 406 of item 401 is null, and next pointer of item 401 points to item 402. Back pointer 407 of item 402 points at item 401, and next pointer 412 points at item 403. With just three items in list 400, item 403 is the last item in list 400. Accordingly next pointer 413 of item 403 is null while its back pointer points at item 402. Tail pointer 417 points at item 403 because it is the last item in the list. Next pointer 411-413 and head pointer 416 form a first set of pointers which have an analogous function. Beginning with head pointer 416, list 400 can be traversed in a forward direction using this set of pointers. Tail pointer 417 and back pointers 406-408 form a second set of pointers. Beginning with tail pointer 417, list 400 can be traversed in a backward direction using the second set of pointers.

List 400' is the same as list 400 except that item 404 is the last item in the list. Consequently, tail pointer 417 points at item 404 instead of item 403 and next pointer 413 of item 403 points at item 404 instead of being null. Back pointer 409 of item 404 points at item 403, and next pointer 414 is null. Lists 400 and 400' are both properly formed doubly-linked lists with head and tail pointers. List 400' can be viewed as list 400 with a new item added at the tail. Alternatively list 400 can be viewed as list 400' but with the tail item deleted. A function of the CAS2 instruction is to be able to either add or delete an item at the head or tail using uninterruptable cycles. The first explanation is for adding an item at the tail. The list is originally list 400 which is changed by the CAS2 instruction to become list 400'.

Before the CAS2 instruction is performed, item 404 must be properly formed. As part of the formation process, item 404 has its back pointer 409 point to item 403 and next pointer 414 null. Also, prior to the CAS2 instruction, tail pointer 417 and next pointer 413 must be read and stored. Another step prior to beginning the CAS2 instruction is to store the values which are to be put into tail pointer 417 and next pointer 413 so that these pointers will point to item 404. These values are sometimes referred to as swap values. As shown in FIGS. 1 and 2 there are numerous registers available for storing these swap values. These two pointers are the two that must be changed upon the addition of item 404 to list 400 in order to form list 400'. Tail pointer 417 and next pointer 413 must both be changed to point at item 404. During the formation of item 404 and after the reading of tail pointer 417 and next pointer 413, list 400 may be changed so that item 403 is no longer the last item in list 400. If that is the case, then at least one of tail pointer 417 and next pointer 413 will change. If such a change has occurred then item 404 cannot be properly added. The CAS2 instruction ensures that nothing has changed which will prevent the proper addition of item 404 before updating tail pointer 417 and next pointer 413. Another characteristic of the CAS2 instruction is that it will continue to completion even if an interrupt is received during the instruction. An instruction having this characteristic is often called an uninterruptable instruction.

To begin the CAS2 instruction, the RMC mode is instituted and the RMC signal is generated to ensure that the CAS2 instruction has exclusive use of the bus until the instruction is terminated. This prevents any changes to list 400 except those caused by the CAS2 instruction itself. The values at tail pointer 417 and next pointer 413 are then consecutively read. These two values are then compared to the corresponding values previously stored. This can be achieved by subtracting one from the other. If the result after subtraction is zero, then the values are the same. If the result is other than zero, then the values are different. If the values are the same, then the stored values for pointing to item 404 are swapped for those values in next pointer 413 and tail pointer 417. After this swap the result is shown in FIG. 4B as list 400' with item 404 at the end. If either of the values are different, the RMC mode is terminated and the values last read from tail pointer 417 and next pointer 413 are stored in registers. In view of the changed circumstances as indicated by the values being different, a decision is then made available as to the disposition of item 404. If item 404 is still to be added, a new CAS2 instruction can be instituted after pointers 409 and 414 have been properly updated to reflect the changed conditions.

Another possibility is for list 400' to be the beginning point and for the last item in the list, item 404, to be deleted. In such case list 400 shown in FIG. 4A is the desired result. As in the case for adding an item as previously described, some steps must be taken before the CAS2 instruction begins. In this deletion case, next pointer 413 is to swap its value which points to item 404 for the null value and tail pointer 417 is to swap its value which points to item 404 for a value which points to item 403. In preparation for this swap, the swap values comprising the null value and the value which points to item 403 are stored in registers. Also stored in registers are the compare values which comprise the value in tail pointer 417 which points to item 404 and the value in next pointer 413 which also points to item 404. The CAS2 instruction is then begun by initiating the RMC mode. The test values comprising the values in next pointer 413 and tail pointer 417 are then compared to the corresponding stored compare values. If each compare value is the same as its corresponding test value, the swap values are swapped for the corresponding values in next pointer 413 and tail pointer 417. The result of this swap is list 400 shown in FIG. 4A. If either of the compare values is different than its corresponding test value, then the swap does not occur, the RMC mode is terminated, and the new values in next pointer 413 and tail pointer 417 replace the previous compare values stored in registers.

Figure 3A:
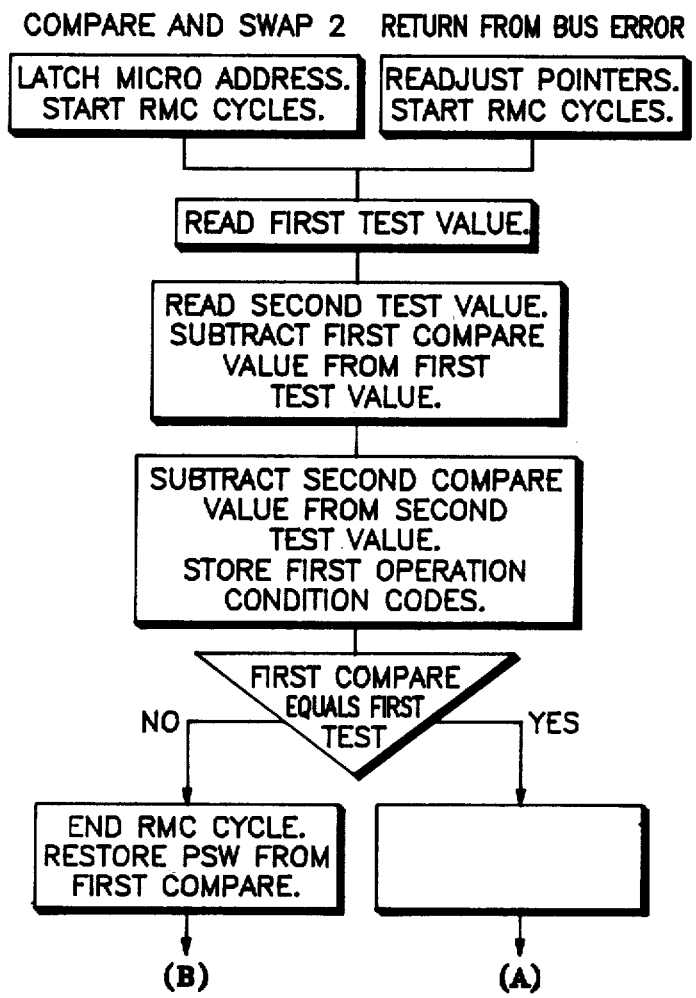
FIGS. 3A and 3B, placed top to bottom, comprise a micro-control flow diagram according to a preferred embodiment of the invention.
Figure 3B:
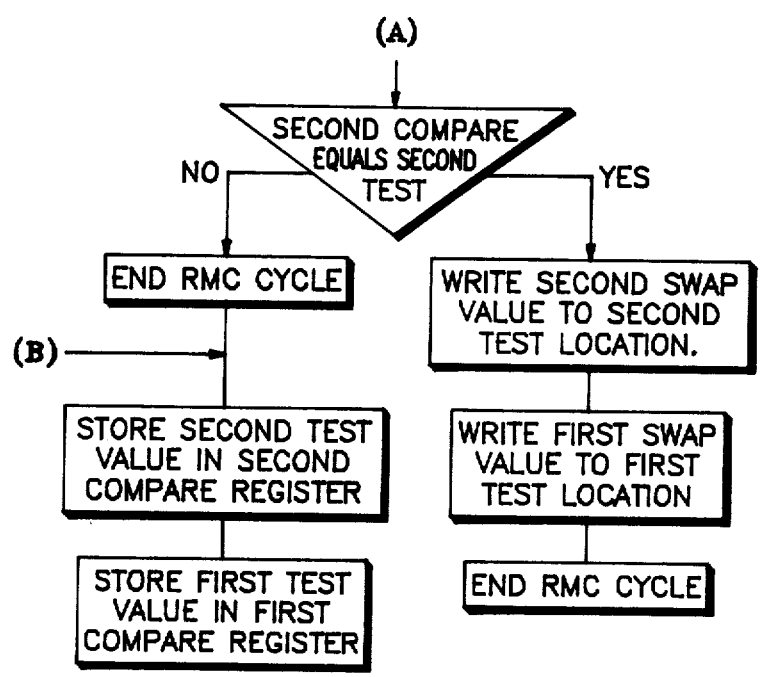

The CAS2 instruction itself which is used to achieve a deletion or addition of an item is shown in FIGS. 3A and 3B. Compare values and swap values must be established prior to beginning the CAS2 instruction. The compare values are the ones which are read from the locations which need to be changed in order to properly effect the addition or deletion of the particular item. The swap values are those which are to replace the values in the locations which are to have their values changed. After initiating the RMC mode, a first test value is read from a first of the locations to be changed. A second test value is read from the other location while the first test value is compared to its corresponding compare value. A compare value is said to be corresponding when it was read from the same location as the test value to which it was said to be corresponding. The second test value is then compared to its corresponding compare value if the first test value is the same as its corresponding compare value. If not, the RMC mode is terminated. If the RMC mode is not terminated and if the comparison of the second test value to the second compare value shows that these two values are the same, then the swap value for the location of the first compare and test values is substituted for the first test value at that location. The other swap value then replaces the second test value at that location. If the second test value is not the same as the second test value, then the RMC is terminated at that point so that no swap values are swapped with the test values. Consequently, any two values can be safely swapped in a single instruction. The use is not limited to that described for FIG. 4A and FIG. 4B.

Figure 5A:
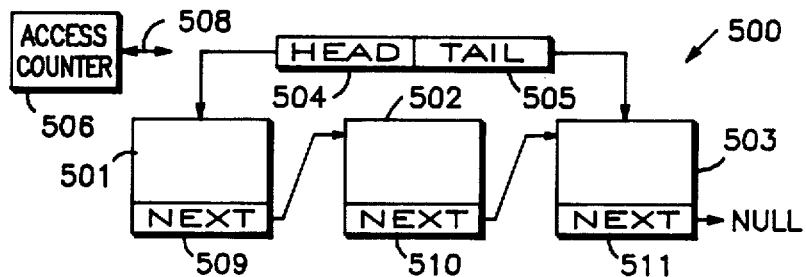
FIGS. 5A and 5B are diagrams of singly-linked lists useful for understanding how to add or delete an item at the middle of a singly-linked list.
Figure 5B:
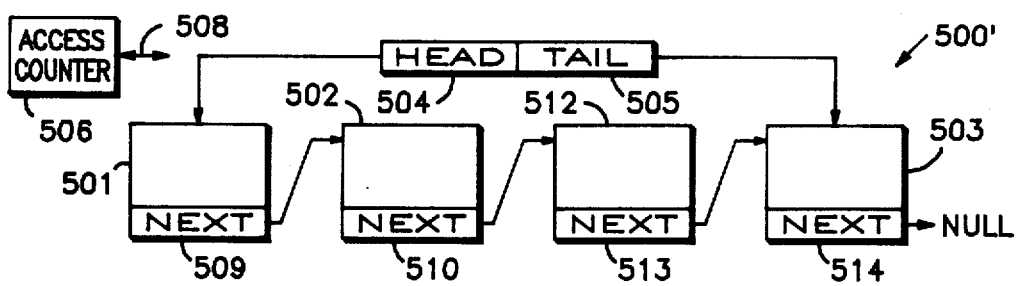

Shown in FIG. 5A is a list 500 comprised of an item 501, an item 502, an item 503, a head pointer 504, a tail pointer 505 and an access counter 506. Access counter 506 has a value which is incremented every time that a change is made to list 500. The value is read or incremented on a bidirectional bus 508. Each item 501-503 has a next pointer 509, 510, and 511, respectively. Next pointer 509 of item 501 points at item 502, next pointer 510 of item 502 points at item 502, and next pointer 511 of item 503 is null. Head pointer 504 points at item 501 which is thus a head item. Tail pointer 505 points at item 503 which is thus a tail item. List 500 is a properly formed singly-linked list having head and tail pointers and an access counter. List 500' shown in FIG. 5B is the same as list 500 except that an item 512 has been inserted between items 502 and 503. With item 512 so inserted, next pointer 510 points at item 512 instead of item 503 as it did in list 500. Item 512 has a next pointer 513 pointing at item 503. List 500' is thus a properly formed singly-linked list with one additional item to that of list 500, the additional item being inserted in the middle of the list between the head and tail items 501 and 503. Whereas FIGS. 4A and 4B are useful for describing the addition and deletion of an item at an end of a list, FIGS. 5A and 5B are useful for describing the addition and deletion of an item in the middle of a list. For describing an addition or insertion of an item, FIG. 5A shows before and FIG. 5B shows after the insertion. Conversely, for a deletion, FIG. 5B shows before and FIG. 5A shows after.

The insertion of item 512 into list 500 between items 502 and 503 will be described first. The changes that need to be made to list 500 in order to effect the insertion are to next pointer 510 of item 502 and the value in access counter 506. Instead of pointing at item 503, next pointer 510 will point to item 512. Prior to beginning the CAS2 instruction, compare values and swap values must be stored. The compare values to be stored are those in next pointer 510 which points to item 503, and access counter 506. The swap values are those to be inserted into next pointer 510 and provided to access counter 506 to effect the insertion of item 512. After the insertion next pointer 510 is to have a value which points to item 512, and access counter 506 will be incremented. In order to properly prepare item 512 it is necessary to know which item is to be after 512 in order to establish where next pointer 513 is to point. After item 512 has then been properly prepared, the CAS2 instruction can commence. The RMC mode is initiated and next pointer 510 and access counter 506 are read. The values at next pointer 510 and access counter 506 which are read during the CAS2 instruction are check values. Before the swap values replace these check values in next pointer 510, it is necessary to determine that items 502 and 503 have retained their relationship to each other and that access counter 506 has not been incremented. While item 512 was being formed, one of items 502 or 503 may have been deleted. Alternatively, another item or items may have been inserted between items 502 and 503. Another possibility is that items 502 and 503 may have retained their relationship to each other but have been moved to another list. If something has changed, it would be improper to insert the swap values into next pointer 510 and access counter 506. Consequently, the check values are compared to the compare values to make certain they are the same before inserting the swap values. In particular, the value read at next pointer 510 before the CAS2 instruction commenced is compared to the value which is present at next pointer 510 after the CAS2 instruction has commenced, and the value read at access counter 506 before the CAS2 instruction commenced is compared to the value which is present after the CAS2 instruction at access counter 506. If the comparisons show that the check values equal the compare values, then the swap values are inserted into next pointer 510 and access counter 506 so that next pointer 510 points at item 512 and that access counter 506 is incremented. When such insertion is made, the result is list 500' shown in FIG. 5B. If either of the comparisons results in showing that one of the check values is not the same as its corresponding compare value, neither swap value is inserted. The comparisons are consecutively done, then if appropriate in view of the comparisons, the insertions of the swap values are also consecutively done.

The CAS2 instruction is also useful for deleting an item from the middle of a list, such as deleting item 512 from list 500' to obtain list 500. The compare values which are read prior to commencing the CAS2 instruction are those at next pointer 510 and access counter 506. The swap value for next pointer 510 will be that for pointing at item 503. The swap value for access counter 506 will be the incremented value of the access counter 506. When the CAS2 instruction commences the RMC mode is initiated. A first test value is read from either next pointer 510 or access counter 506. This first test value is then compared to its corresponding compare value, while a second test value is read from the other of next pointer 510 or access counter 506. If the first test value is not the same as its corresponding compare value, then the CAS2 instruction and RMC mode are terminated. If the first test value is the same as its corresponding compare value, then the second test value is compared to its corresponding compare value. If the second test value is not the same as its corresponding compare value, the CAS2 instruction and the RMC mode are terminated, and the first and second test values replace the compare values. If the second test value is the same as its corresponding compare value, the swap values are consecutively swapped for the values in next pointer 510 and access counter 506. In particular, the swap value which is inserted into next pointer 510 causes next pointer 510 to point at item 503, and the swap value which is inserted into access counter 506 is the incremented value of the access counter 506. Whether next pointer 510 or access counter 506 is updated before the other is not significant. After effecting the insertion of the swap values, the CAS2 instruction and RMC mode are terminated. The CAS2 instruction thus effects the deletion of item 512 from list 500' to obtain list 500.

The CAS2 instruction is not limited to safely swapping 2 values in a linked list situation. The instruction can be useful anytime it is desirable to simultaneously swap 2 values. Such swapping can involve values of other types of list, but may also involve values unrelated to lists. The CAS2 instruction may be useful in any data structure which can have one location changed in conjunction with an acccess counter. A tree structure is such a situation where it can be useful to swap 2 such values effectively simultaneously.

We claim:

1. In a data processor which executes instructions and has a plurality of storage locations, a method for changing a value at a first storage location and a value at a second storage location, the method comprising the steps of:

storing at a third storage location the value at the first location;

storing at a fourth storage location the value at the second location;

storing a selected first swap value at a fifth storage location;

storing a selected second swap value at a sixth storage location; and then executing an instruction which performs in an uninterruptable sequence the steps of:

comparing the value at the third storage location to the value at the first storage location;

comparing the value at the fourth storage location to the value at the second storage location; and if both of the values at the third and fourth storage locations are the same as the respective values at the first and second storage locations;

replacing the value at the first storage location with the first swap value; and replacing the value at the second storage location with the second swap value.

2. In a data processor having a plurality of storage locations, a method for changing the contents of a linked list which requires changing contents at first and second pointer locations in order to effect a change in said list, the method comprising the steps of:

storing at a first storage location the value at the first pointer location;

storing at a second storage location the value at the second pointer location;

storing a selected first swap value at a third storage location;

storing a selected second swap value at a fourth storage location; and performing in an uninterruptible sequence the steps of;

comparing the value at the first storage location to the value at said first pointer location;

comparing the value at the second storage location to the value at said second pointer location; and if both of the values at the first and second storage locations are the same as the respective values at the first and second pointer locations;

replacing the value at the first pointer location with the value at the third storage location; and replacing the value at the second pointer location with the value at the fourth storage location.

3. In a data processor having a plurality of storage locations and having a linked list which has an access counter associated therewith wherein contents at a pointer location and at the access counter are changed in order to effect a change in the list, a method for effecting a change in the list, comprising the steps of:

preparing for the execution of an instruction to be performed by the data processor by:

storing said value at said pointer location at a first storage location;

storing said value at the access counter at a second storage location;

storing a first swap value at a third storage location; and storing a second swap value at a fourth storage location; and executing the instruction, the instruction comprising the uninterruptable steps of:

comparing the value at the first storage location to the value at said pointer location;

comparing the value at the second storage location to the value at the access counter; and if both of the values at the first and second storage locations are the same as the respective values at said pointer location and the access counter;

replacing the value at said pointer location with the value at the third storage location; and replacing the value at the access counter with the value at the fourth storage location.

4. In a data processor having a plurality of storage locations in which the data processor stores and accesses data, means for changing the contents of a value at a first storage location and a value at a second storage location, comprising:

means for storing the value at said first storage location at a third storage location;

means for storing the value at said second storage location at a fourth storage location;

means for storing a first swap value at a fifth storage location;

means for storing a second swap value at a sixth storage location;

means for instructing the data processor to compare the value at the third storage location to the value at said first storage location;

means for instructing the data processor to compare the value at the fourth storage location to the value at said second storage location;

means for instructing the data processor to replace the value at the first storage location with the first swap value if both of the values at the third and fourth storage locations are the same as the respective values at the first and second storage locations; and means for instructing the data processor to replace the value at the second storage location with the second swap value if both of the values at the third and fourth storage locations are the same as the respective values at the first and second storage locations.

5. In a data processor which receives operating directions from locations in ROM, has a plurality of random access storage locations at which values are stored and accessed, and has the ability to operate on a linked list which requires a value at a first storage location and a value at a second location be changed in order to effect a change in said list, means for effecting a change in said linked list, comprising:

a third storage location for storing the value at the first storage location as directed by the data processor;

a fourth storage location for storing the value at the second storage location as directed by the data processor;

a fifth storage location for storing a first swap value;

a sixth storage location for storing a second swap value a plurality of locations in ROM for directing the data processor to perform, in an uninterruptable sequence, the steps of:

comparing the value at the first storage location to the value at the third storage location;

comparing the value at the second storage location to the value at the fourth storage location; and if both of the values at the first and second storage locations are the same as the respective values at the third and fourth storage locations, then:
  replacing the value at the first storage location with the value at the fifth storage location; and
  replacing the value at the second storage location with the value at the sixth storage location.

6. A data processor for changing the contents of a linked list wherein the change is a effected by changing the values at a first storage location and a second storage location, comprising:
  means for storing the value at the first storage location at a third storage location, storing the value at the second storage location at a fourth storage location, storing a swap value at a fifth storage location, and a second swap value at a sixth storage location; and
  means for performing in an uninterruptable sequence the steps of:
    comparing the value at the third storage location to the value at said first storage location;
    comparing the value at the fourth storage location to the value at said second storage location;
    replacing the value at the first storage location with the first swap value and replacing the value at the second storage location with the second swap value if both of the values at the third and fourth storage locations are the same as the respective values at the first and second storage locations.

* * * * *